United States Patent
Polshettiwar et al.

(10) Patent No.: US 11,242,257 B2
(45) Date of Patent: Feb. 8, 2022

(54) SYNTHESIS OF FIBROUS NANO-SILICA SPHERES WITH CONTROLLED PARTICLE SIZE, FIBRE DENSITY, AND VARIOUS TEXTURAL PROPERTIES

(71) Applicant: TATA INSTITUTE OF FUNDAMENTAL RESEARCH, Mumbai (IN)

(72) Inventors: Vivek Polshettiwar, Mumbai (IN); Nisha Bayal, Mumbai (IN); Baljeet Singh, Mumbai (IN); Rustam Singh, Mumbai (IN); Ayan Maity, Mumbai (IN)

(73) Assignee: TATA INSTITUTE OF FUNDAMENTAL RESEARCH, Mumbai (IN)

(*) Notice: Subject to any disclaimer, the term of this patent is extended or adjusted under 35 U.S.C. 154(b) by 459 days.

(21) Appl. No.: 16/064,898

(22) PCT Filed: Apr. 1, 2016

(86) PCT No.: PCT/IB2016/051870
§ 371 (c)(1),
(2) Date: Jun. 21, 2018

(87) PCT Pub. No.: WO2017/134493
PCT Pub. Date: Aug. 10, 2017

(65) Prior Publication Data
US 2019/0002297 A1    Jan. 3, 2019

(30) Foreign Application Priority Data
Feb. 4, 2016 (IN) .............................. 201621004089

(51) Int. Cl.
*C01B 33/18* (2006.01)
*B01J 20/10* (2006.01)
(Continued)

(52) U.S. Cl.
CPC ............. *C01B 33/18* (2013.01); *B01J 20/103* (2013.01); *B01J 20/28007* (2013.01);
(Continued)

(58) Field of Classification Search
CPC ........ B01J 35/06; B01J 35/00; B01J 35/0013; B01J 35/08; B01J 35/1038; B01J 35/1042;
(Continued)

(56) References Cited

U.S. PATENT DOCUMENTS

| | | | |
|---|---|---|---|
| 8,883,308 B2 * | 11/2014 | Polshettiwar | H01M 4/921 428/402 |
| 2013/0152789 A1 * | 6/2013 | Polshettiwar | B01J 20/103 95/139 |
| 2013/0228521 A1 | 9/2013 | Guo et al. | |

FOREIGN PATENT DOCUMENTS

| | | |
|---|---|---|
| WO | 2011107822 A1 | 9/2011 |
| WO | 2015138142 A1 | 9/2015 |

OTHER PUBLICATIONS

Polshettiwar et al. (NPL: "High Surface-Area Silica Nanosphers (KCC-1) with a Fibrous Morphology" Angewandte Chemie International Edition, vol. 49, Issue 50, pp. 9652-9656).*

(Continued)

*Primary Examiner* — Smita S Patel
(74) *Attorney, Agent, or Firm* — IPSILON USA, LLP (57) ABSTRACT

The present disclosure provides a method for synthesizing fibrous silica nanospheres, the method can include, in sequence, the steps of: a) providing a reaction mixture comprising a silica precursor, a hydrolyzing agent, a template molecule, a cosurfactant and one or more solvents; b) maintaining the reaction mixture under stirring for a length of time; c) heating the reaction mixture to a temperature for a length of time; d) cooling the reaction mixture to obtain a solid, and (e) calcinating the solid to pro duce fibrous silica
(Continued)

nanospheres, wherein desirable product characteristics such as particle size, fiber density, surface area, pore volume and pore size can be obtained by controlling one or more parameters of the method. The present disclosure further provides a method for synthesizing fibrous silica nanospheres using conventional heating such as refluxing the reactants in an open reactor, thereby eliminating the need for microwave heating in a closed reactor or the need for any pressure reactors.

10 Claims, 6 Drawing Sheets (51) Int. Cl.
*B01J 20/28* (2006.01)
*B01J 20/30* (2006.01)
*B01J 21/08* (2006.01)
*B01J 35/00* (2006.01)
*B01J 35/06* (2006.01)
*B01J 35/08* (2006.01)
*B01J 35/10* (2006.01)
*B01J 37/00* (2006.01)
*B01J 37/04* (2006.01)
*B01J 37/08* (2006.01)
*B01J 37/34* (2006.01)

(52) U.S. Cl.
CPC ... *B01J 20/28019* (2013.01); *B01J 20/28028* (2013.01); *B01J 20/28061* (2013.01); *B01J 20/28064* (2013.01); *B01J 20/28066* (2013.01); *B01J 20/28071* (2013.01); *B01J 20/28073* (2013.01); *B01J 20/28076* (2013.01); *B01J 20/28088* (2013.01); *B01J 20/3057* (2013.01); *B01J 20/3078* (2013.01); *B01J 20/3085* (2013.01); *B01J 21/08* (2013.01); *B01J 35/0013* (2013.01); *B01J 35/06* (2013.01); *B01J 35/08* (2013.01); *B01J 35/108* (2013.01); *B01J 35/1019* (2013.01); *B01J 35/1023* (2013.01); *B01J 35/1028* (2013.01); *B01J 35/1038* (2013.01); *B01J 35/1042* (2013.01); *B01J 35/1047* (2013.01); *B01J 37/0018* (2013.01); *B01J 37/04* (2013.01); *B01J 37/08* (2013.01); *B01J 37/346* (2013.01); *C01P 2004/03* (2013.01); *C01P 2004/32* (2013.01); *C01P 2004/51* (2013.01); *C01P 2004/61* (2013.01); *C01P 2004/62* (2013.01); *C01P 2004/64* (2013.01); *C01P 2004/90* (2013.01); *C01P 2006/12* (2013.01); *C01P 2006/14* (2013.01); *C01P 2006/17* (2013.01)

(58) Field of Classification Search
CPC .. B01J 35/1047; B01J 35/108; B01J 35/1019; B01J 35/1023; B01J 35/1028; B01J 35/10; B01J 37/04; B01J 37/346; B01J 37/08; B01J 37/0018; B01J 37/00; B01J 20/103; B01J 20/28007; B01J 20/28019; B01J 20/28028; B01J 20/28073; B01J 20/28088; B01J 20/28061; B01J 20/28064; B01J 20/28066; B01J 20/3085; B01J 20/3078; B01J 20/3057; B01J 20/28071; B01J 20/28076; B01J 21/08; C01P 2004/61; C01P 2004/90; C01P 2004/62; C01P 2004/51; C01P 2004/32; C01P 2004/03; C01P 2004/64; C01P 2006/14; C01P 2006/17; C01P 2006/12; C01B 33/18; C01B 33/00
See application file for complete search history.

(56) References Cited

OTHER PUBLICATIONS

International Search Report and Written Opinion for International Application No. PCT/IB2016/051870 dated Jul. 8, 2016.

* cited by examiner

SYNTHESIS OF FIBROUS NANO-SILICA SPHERES WITH CONTROLLED PARTICLE SIZE, FIBRE DENSITY, AND VARIOUS TEXTURAL PROPERTIES

FIELD OF THE INVENTION

The present disclosure pertains to technical field of nanoparticles. In particular, the present disclosure pertains to synthesis of fibrous silica nanoparticles with controlled particle size, fibre density, and tunable textural properties.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Silica having high surface area has wide applications in almost every field. Importantly, the inherent properties of silica can be tuned by varying different parameters such as size, shape, morphology etc. Demand for silica nanospheres with different sizes, dimensions and morphology is continuously growing because of modern industries spur a tremendous interest for such materials. The effectiveness of these nanospheres is mainly due to their micro and mesostructures which allow active molecules to disperse on the large internal surface that in turn improves the activity. Importantly, accessibility of active sites inside the nano-silica particles is a crucial parameter as poor accessibility will limit their applications where significant mass transport is vital. Therefore, high surface nano-silica with better accessibility is highly desirable.

Fibrous silica nanosphere (also referred to as "KCC-1") and its method of production are disclosed in several references, See, e.g. 1. US20110253643A1 (High surface area fibrous silica nanoparticles); 2. V. Polshettiwar et al. "High surface area silica nanospheres (KCC-1) with fibrous morphology, Angew. Chem. Int. Ed. 2010, 49, 9652-9656."; 3. V. Polshettiwar et al. "Fibrous nano-silica (KCC-1) supported palladium catalyst: Suzuki coupling reactions under sustainable conditions, ChemSusChem 2012, 5, 85-89."; 4. V. Polshettiwar et al. "Fibrous nano-silica supported ruthenium (KCC-1/Ru): a sustainable catalyst for the hydrogenolysis of alkanes with good catalytic activity and lifetime, ACS Catalysis 2012, 2, 1425-1431."; 5. V. Polshettiwar et al, "Efficient synthesis of monodisperse metal (Rh, Ru, Pd) nanoparticles supported on fibrous nanosilica (KCC-1) for catalysis, ACS Sustain. Chem. Eng. 2015, 10.1021/acssuschemeng.5b00812"; 6. V. Polshettiwar et al. T. C. Jean et al. "Hydro-metathesis of olefins: a catalytic reaction using a bifunctional single-site tantalum hydride catalyst supported on fibrous silica (KCC-1) nanospheres, Angew. Chem. Int. Ed. 2011, 50, 2747-2751," ; 7. M. Bouhrara et al, "Nitridated fibrous silica (KCC-1) as a sustainable solid base nanocatalyst, ACS Sustain. Chem. Eng. 2013, 1, 1192-1199."; 8. A. S. L Thankamony et al. "Insights into the catalytic activity of nitridated fibrous silica (KCC-1) nanocatalysts from $^{15}N$ and $^{29}Si$ NMR enhanced by dynamic nuclear polarization, Angew. Chem. Int. Ed. 2015, 54, 2190-2193."; 9. U. Patil et al. "Silicon oxynitrides of KCC-1, SBA-15 and MCM-41: Unprecedented materials for $CO_2$ capture with excellent stability and regenerability, Chemical Sci. 2012, 3, 2224-2229."

After the discovery of KCC-1 in March 2010, several reputed groups worldwide reported the successful use of KCC-1 for various applications such as catalysis, photocatalysis, $CO_2$ capture-conversion, sensing, detection and extraction of ions, supercapacitors, drug delivery and other biomedical applications. See, e.g. 1. Moon S. D. & Lee, L. K. "Tunable synthesis of hierarchical mesoporous silica nanoparticles with radial wrinkle structure. Langmuir, 28, 12341-12347 (2012)"; 2. Kun, Z. et al. "Facile large-scale synthesis of monodisperse mesoporous silica nanospheres with tunable pore structure. J. Am. Chem. Soc. 135, 2427-2430 (2013)"; 3. Gal, S. L et al. "Fibrous-structured magnetic and mesoporous $Fe_3O_4$/silica microspheres: synthesis and intracellular doxorubicin delivery. J. Mater. Chem. 21, 16420-16426 (2011)"; 4. Gai, S. L et al. "Uniform and size-tunable mesoporous silica with fibrous morphology for drug delivery. Dalton Trans. 41, 4511-4516 (2012)"; 5. Yu, K. J., Zhang et al. "Synthesis of fibrous monodisperse core-shell $Fe_3O_4/SiO_2$/KCC-1. Mater. Lett. 106, 151-154 (2013)"; 6. Peng et al., "One-pot synthesis of benzamide over a robust tandem catalyst based on center radially fibrous silica encapsulated TS-1. Chem. Commun. 49, 2709-2711 (2013)"; 7. Atabaev, T. S. et al. "Mesoporous silica with fibrous morphology: a multifunctional core-shell platform for biomedical applications. Nanotechnology 24, 10.1088/0957-4484/24/34/345603 (2013)"; 8. Zhu, J., Zhao, X. J., Wang, P. C. & Lu, M. "Synthesis of fibrous nano-silica-supported tempo and its application in selective oxidation of alcohols. Chem. Lett. 42, 1505-1507 (2013)"; 9. Peng, H. G., Wang, D. R., Xu, L. & Wu, P. "One-pot synthesis of primary amides on bifunctional Rh(OH)(x)/TS-KCC-1 catalysts. Chinese J. Catal. 34, 2057-2065 (2013)"; 10. Yu, K. J., Zhang et al., "Synthesis of fibrous monodisperse core-shell $Fe_3O_4/SiO_2$/KCC-1. Mater. Lett. 106, 151-154 (2013)"; 11. Le, X. D., Dong, Z. P., Zhang, W., Li, X. L. & Ma, J. T. "Fibrous nano-silica containing immobilized Ni@Au core-shell nanoparticles: A highly active and reusable catalyst for the reduction of 4-nitrophenol and 2-nitroaniline. J. Mol. Catal. A-Chem. 395, 58-65 (2014)"; 12. Dong. Z. P. et al. "Silver nanoparticles immobilized on fibrous nano-silica as highly efficient and recyclable heterogeneous catalyst for reduction of 4-nitrophenol and 2-nitroaniline. App. Catal. B Env. 158, 129-135 (2014)"; 13. Yang, H. L., Li, S. W., Zhang, X. Y., Wang, X. Y. & Ma, J. T. "Imidazolium ionic liquid-modified fibrous silica microspheres loaded with gold nanoparticles and their enhanced catalytic activity and reusability for the reduction of 4-nitrophenol. J. Mater. Chem. A 2. 12060-12067 (2014)"; 14. Siddiqui, Z. N., Khan, K. & Ahmed, N. "Nano fibrous silica sulphuric acid as an efficient catalyst for the synthesis of beta-enaminone. Catal. Lett. 144, 623-632 (2014)"; 15. Le, X. D, et al. "Palladium nanoparticles immobilized on core-shell magnetic fibers as a highly efficient and recyclable heterogeneous catalyst for the reduction of 4-nitrophenol and Suzuki coupling reactions. J. Mater. Chem. A 2, 19696-19706 (2014)"; 16. Yang, H., et al. "Facile one-pot approach to the synthesis of spherical mesoporous silica nanoflowers with hierarchical pore structure. App. Sur. Sci. 314, 7-14 (2014)"; 17. Zhang, J. S. et al. "Nanospherical carbon nitride frameworks with sharp edges accelerating charge collection and separation at a soft photocatalytic interface. Adv. Mater. 26, 4121-4126 (2014)"; 18. Bhunia, M. K. et al. "Dendritic Tip-on polytriazine-based carbon nitride photocatalyst with high hydrogen evolution activity. Chem. Mater. 27, 8237-8245 (2015)"; 19. Munaweera, I., Hong, J., D'Souza, A. & Balkus, K. J. "Novel wrinkled periodic mesoporous organosilica nanoparticles for hydrophobic anticancer drug delivery. *J. Porous Mater.* 22, 1-10 (2015)"; 20. Guo, D. Y. et al. "Hydrangea-like multi-scale carbon hollow submicron spheres with hierarchical pores for high performance supercapacitor electrodes. *Electrochimica Acta* 176, 207-214 (2015)"; 21. Dong, Z. P., Yu, G. Q. & Le, X. D. "Gold nanoparticle modified magnetic fibrous silica microspheres as a highly efficient and recyclable catalyst for the reduction of 4-nitrophenol. *New J. Chem,* 39, 8623-8629 (2015)"; 22. Sun, Z. B. et al. "A multifunctional magnetic core-shell fibrous silica sensing probe for highly sensitive detection and removal of Zn2+ from aqueous solution. *J. Mater. Chem. C* 3, 4713-4722 (2015)"; 23. Le, X .D. et al. "Fibrous nano-silica supported palladium nanoparticles: An efficient catalyst for the reduction of 4-nitrophenol and hydrodechlorination of 4-chlorophenol under mild conditions. *Catal. Commun.* 59. 21-25 (2015)"; 24. Sadeghzadeh, S. M., "A heteropoly acid-based ionic liquid immobilized onto fibrous nano-silica as an efficient catalyst for the synthesis of cyclic carbonate from carbon dioxide and epoxides. *Green Chem.* 17, 3059-3066 (2015)"; 25. Sun, Z. B. et al. "Multifunctional fibrous silica composite with high optical sensing performance and effective removal ability toward $Hg^{2+}$ ions. *J. Mater. Chem. B* 3, 3201-3210 (2015)"; 26. Dong, Z. P. et al. "Ni@Pd core-shell nanoparticles modified fibrous silica nanospheres as highly efficient and recoverable catalyst for reduction of 4-nitrophenol and hydrodechlorination of 4-chlorophenol. *App. Catal. B-Env.* 162, 372-380 (2015)"; 27. Aghakhani, A., Kazemi, E. & Kazetnzad, M. "Preparation of a novel KCC-1/nylon 6 nanocomposite via electrospinning technique, *J. Nanoparticle Res.* 17, 10.1007/s11051-015-3190-3 (2015)"; 28. Qureshi, Z. S. et al. "Palladium nanoparticles supported on fibrous-structured silica nanospheres (KCC-1): an efficient and selective catalyst for the transfer hydrogenation of alkenes. *ChemCatChem* 7, 635-642 (2015)"; 29. Du, X. & Qiao, S. Z., "Dendritic silica particles with center-radial pore channels: Promising platforms for catalysis and biomedical applications. *Small* 11, 392-413 (2015)".

The reported fibrous silica nanospheres (KCC-1) exhibit excellent physical properties, including high surface area, fibrous morphology, good thermal/hydrothermal, and high mechanical stability. Further, KCC-1 exhibits high surface area by virtue of its fibrous structure instead of pores (unlike MCM-41 and SBA-15 silicas), and hence easily accessible. Metal nanoparticles supported on KCC-1 showed multifold increase in their catalytic activity and stability as compared to MCM-41 and SBA-15 supported catalysts for various challenging reactions such as metathesis, hydrogenolysis, C-C coupling reactions etc. Tantalum hydride (TaH) supported on KCC-1 catalyzed a new hydro-metathesis reaction of olefins with remarkable catalytic activity and stability. Similarly, KCC-1 based oxynitrides showed multifold enhancement in activity as a solid base than the known catalysts. The enhancement in the activity of KCC-1 was explained on the basis of excellent accessibility of active sites due to the open and flexible fibrous structure of KCC-1, as well as due to different types of amine groups present on the surface. KCC-1 oxynitrides were also used to capture $CO_2$, and they showed good. $CO_2$ capture capacity, faster kinetics, easy regeneration, excellent mechanical strength, and high thermal stability. Asefa et al. (Dendritic silica nanomaterials (KCC-1) with fibrous pore structure possess high DNA adsorption capacity and effectively deliver genes in vitro, *Langmuir* 2014, 30, 10886-10889) showed KCC-1 possesses high DNA adsorption capacity and effective in vitro delivery of genes, All in all, it is the fibrous morphology of KCC-1 which provides better accessibility of active sites for enhanced catalytic activities and capture efficiencies.

Although the fibrous silica nanospheres (KCC-1) possess unique textural and physical properties and showed dramatic enhancement in activity, control over their particle size, fiber density and textural properties such as surface area, pore volume, pore size are not achieved yet, which are critical parameters for successful development of fibrous nano-silica spheres supported catalysts/photo catalysts, sorbents as well as drug delivery. For example, drug delivery application needs smaller particles (less than 200 nm), while catalysts will be stable if particle size is bigger (without compromising the surface area) due to less aggregation/sintering. Light scattering events can be increased by using bigger sized fibrous nano-silica spheres (KCC-1) and high surface area, which will directly result in better photo catalytic applications. Fiber density of nano-silica spheres can also be used to harvest light by increasing its internal reflections/scattering by tuning its internal structure. Fiber density control will allow the tuning of pore size which will allow, tuning the selectivity in catalysis and adsorption applications.

Accordingly, there exists a need in the art for a simple and highly efficient protocol for the synthesis of fibrous silica nanospheres with controlled size, fiber density and tunable textural properties such as surface area, pore volume, pore size. Also, there is a need in the art for a simple method for synthesizing fibrous silica nanospheres using non-pressurized reactors, e.g. open or reflux conditions, thereby eliminating the need for microwave or pressure reactors.

The present invention satisfies the existing needs, as well as others, and generally overcomes the deficiencies found in the prior art.

OBJECTS OF THE INVENTION

It is an object of the present disclosure to provide a method for synthesizing fibrous silica nanospheres with greater control of size and morphology.

It is a further object of the present disclosure to provide a method for synthesizing fibrous silica nanospheres with controlled particle size, fiber density and textural properties such as surface area, pore volume and pore size using non-pressurized reactors.

It is another object of the present disclosure to provide a simple and highly efficient method for synthesizing fibrous silica nanospheres, wherein the particle size, fiber density, surface area, pore size and pore volume of fibrous silica nanospheres can be effectively controlled and tuned by changing the reaction parameters.

It is another object of the present disclosure to provide a method for synthesizing high surface area fibrous silica nanospheres in wide range of particle sizes with controlled pore volume, pore size and fiber density.

It is another object of the present disclosure to provide a method for synthesizing fibrous silica nanospheres using conventional heating such as refluxing in an open reactor, thereby eliminating the need for microwave heating in a closed reactor or the need for any sophisticated heating assembly.

It is another object of the present disclosure to provide a simple and highly efficient method that does not require microwave or pressure reactors. It is another object of the present disclosure to provide a method for synthesizing fibrous silica nanospheres which obviates the disadvantages associated with the known methods.

SUMMARY OF THE INVENTION

Embodiments of the present disclosure relate to methods of synthesizing fibrous silica nanospheres, wherein the particle size, fiber density, and textural properties such as surface area, pore volume and pore size of the silica nanospheres can be tuned by controlling the reaction parameters during synthesis.

In an aspect, the present disclosure provides a method for synthesizing fibrous silica nanospheres, the method can include, in sequence, the steps of: a) providing a reaction mixture comprising a silica precursor, a hydrolyzing agent, a template molecule, a co-surfactant and one or more solvents; b) maintaining the reaction mixture under stirring for a length of time; c) heating the reaction mixture to a temperature for a length of time; d) cooling the reaction mixture to obtain a solid, and (e) calcinating the solid to produce fibrous silica nanospheres, wherein desirable product characteristics such as particle size, fiber density, surface area, pore volume and pore size can be obtained by controlling one or more parameters of the method during the synthesis.

In an embodiment, particle size, fiber density, surface area, pore size and pore volume of the fibrous silica nanospheres can be effectively controlled and tuned by controlling one or more parameters of the method selected from concentration of the hydrolyzing agent in the reaction mixture, concentration of the template molecule in the reaction mixture, concentration of the co-surfactant in the reaction mixture, concentration of the one or more solvents in the reaction mixture, heating temperature of the reaction mixture, and reaction time.

In an embodiment, fibrous silica nanospheres can be synthesized by microwave (MW) assisted solvo-thermal heating of tetraethoxysilane (TEOS), utilizing urea as hydrolyzing/condensation reagent and cetyltrimethylammonium bromide (CTAB) as template, 1-pentanol as co-surfactant in water: cyclohexane solvent mixture at 120° C.

In an embodiment, fibrous silica nanospheres with controlled size and morphology can be synthesized by heating the reactants such as silica precursor, hydrolyzing agent, template molecule and co-surfactant dissolved in one or more solvents under reflux conditions in an open reactor to effect the reaction between the reactants.

In another embodiment, the present disclosure provides a continuous flow method for synthesizing fibrous silica nanospheres, the method can include the steps of (a) flowing a silica precursor, a hydrolyzing agent, a template molecule, a co-surfactant and one or more solvents into a flow reactor to form a reaction solution; (b) heating the reaction solution within a heating source for a length of time; and (c) obtaining fibrous silica nanospheres.

In an embodiment, the methods of the present disclosure can enable synthesis of fibrous silica nanospheres with particle size ranging from 1 nm to 100 micron with varied fiber density, wherein number of fibers in each sphere can vary from 10 fibers to 10000000 fibers.

In an embodiment, the methods of the present disclosure can enable synthesis of fibrous silica nanospheres with particle size ranging from 1 nm to 100 micron with varied pore volume that can range from 0.1 to 5 $cm^3/gm$.

In an embodiment, the methods of the present disclosure can enable synthesis of fibrous silica nanospheres with particle size ranging from 1 nm to 100 micron with varied pore size distribution that can range from 0.1 nm to 500 nm.

In an embodiment, the methods of the present disclosure can enable synthesis of fibrous silica nanospheres with particle size ranging from 1 nm to 100 micron with varied surface area that can range from 100 to 5000 $cm^2/gm$.

In another embodiment, the present disclosure provides a method for synthesizing $CO_2$ sorbents by functionalizing the surface of fibrous silica nanospheres by physical or covalent loading/functionalization using various amine molecules, C3N4 molecule, dendrimer, polymer or other amine containing molecules.

In another embodiment, the present disclosure provides a method for synthesizing catalysts and photocatalysts by physical or covalent coating the fibers of silica nanospheres by various metal oxides, C3N4 molecule, graphene, carbon, perovskite, dyes, quantum dots, metal, polymer and dendrimer.

In another embodiment, the present disclosure provides a catalyst comprising a plurality of fibrous silica nanospheres, wherein the fibrous silica nanospheres are synthesized in accordance with the methods of the present disclosure.

According to embodiments of the present disclosure, fibrous silica nanospheres with controlled particle size and morphology can be synthesized under reflux conditions, by mixing the reactants in an open reactor and heating them at solvent boiling point or lower temperature.

In an embodiment, fibrous silica nanospheres with controlled particle size and morphology can be synthesized without employing microwave radiation or pressure reactors.

Various objects, features, aspects and advantages of the inventive subject matter will become more apparent from the following detailed description of preferred embodiments,

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

(FIG. 4A), 140° C. (FIG. 4B), in accordance with embodiments of the present disclosure.

DETAILED DESCRIPTION OF THE INVENTION

The following is a detailed description of embodiments of the disclosure. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

Unless the context requires otherwise, throughout the specification which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

In sonic embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The headings and abstract of the invention provided herein are for convenience only and do not interpret the scope or meaning of the embodiments.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Various terms as used herein are shown below. To the extent a term used in a claim is not defined below, it should be given the broadest definition persons in the pertinent art have given that term as reflected in printed publications and issued patents at the time of filing.

Embodiments of the present disclosure relate to methods of synthesizing fibrous silica nanospheres, wherein the particle size, fiber density, and textural properties such as surface area, pore volume and pore size of the silica nanospheres can be tuned by controlling the reaction parameters during synthesis.

In an aspect, the present disclosure provides a method for synthesizing fibrous silica nanospheres, the method can include, in sequence, the steps of: a) providing a reaction mixture comprising a silica precursor, a hydrolyzing agent, a template molecule, a co-surfactant and one or more solvents; b) maintaining the reaction mixture obtained in step (a) under stirring for a length of time; c) heating the reaction mixture to a temperature for a length of time; d) cooling the reaction mixture to obtain a solid, and (e) calcinating the solid to produce fibrous silica nanospheres, wherein desirable product characteristics such as particle size, fiber density, surface area, pore volume and pore size can be obtained by controlling one or more parameters of the method during the synthesis.

In an embodiment, fibrous silica nanospheres can be synthesized by microwave (MW) assisted solvo-thermal heating of tetraethoxysilane (TEOS), utilizing urea as hydrolyzing/condensation reagent and cetyltrimethylammonium bromide (CTAB) as template, 1-pentanol as co-surfactant in water: cyclohexane solvent mixture at 120° C.

In an embodiment, the particle size, fiber density, surface area, pore size and pore volume of the fibrous silica nanospheres can be effectively controlled and tuned by changing the reaction parameters of the method of the present disclosure such as, urea concentration, CTAB concentration, 1-pentanol concentration, reaction time and temperature, solvent ratios, and outside stirring time.

In an embodiment, fibrous silica nanospheres with controlled size and morphology can be synthesized by heating the reactants such as silica precursor, hydrolyzing agent, template molecule and co-surfactant dissolved in one or more solvents under reflux conditions in an open reactor to effect the reaction between the reactants.

In an embodiment, fibrous silica nanospheres with particle size as small as 170 nm and as big as 1120 nm can be synthesized using the methods of the present disclosure.

In an embodiment, the methods of the present disclosure can enable synthesis of fibrous silica nanospheres with fiber density tuning from less to medium to very dense, which in turn can allow tuning of pore volume.

In an embodiment, fibrous silica nanospheres can be synthesized with surface area of 1244 $m^2/g$ and pore volume of 2.18 $cm^3/g$, using the methods of the present disclosure.

According to embodiments, the methods of the present disclosure can enable synthesis of fibrous silica nanospheres with similar particle size, but different surface area, pore volume and fiber density. This can allow systematic study on the effect of each of these parameters on catalysis, adsorption, light harvesting and various other applications.

According to embodiments of the present disclosure, there can be direct relationship between fiber density and pore volume. With increase in fiber density, pore volume can decrease, as the space between the fibers which provide the overall volume reduces. Pore size distribution can narrow with increase in fiber density, with decrease in density of number pores in larger mesopores region. This may due to V-shape pore/fiber channel in fibrous silica nanospheres, which can have pore size ranging from few nm, (3.7 nm as major pore may be close to the point of origin/center point of the sphere) and then pores can gradually increase in widths due to V-shape structure. When fiber density is less, fibers can relatively distant from each other and the V-shape may get broaden, which in turn can increase the density of larger pores and can reduce the number of small pores. On the other hand, increase in fiber density can cause straightening (contraction in V-shape), and thus majority of pores may be around 3.7 nm. Further, there can be relationship between fiber density and surface area and pore volume. Spheres with less dense fibers can have more surface area/pore volume and dense spheres can have less surface area/pore volume.

In an embodiment, the methods of the present disclosure can enable synthesis of fibrous silica nanospheres with particle size ranging from 1 nm to 100 micron with varied fiber density, wherein number of fibers in each sphere can vary from 10 fibers to 10000000 fibers.

In an embodiment, the methods of the present disclosure can enable synthesis of fibrous silica nanospheres with particle size in the range of from 1 nm to 100 micron with varied pore volume that can range from 0.1 to 5 $cm^3/gm$.

In an embodiment, the methods of the present disclosure can be used to synthesize fibrous silica nanospheres with particle size in the range of from 1 nm to 100 micron with varied pore size distribution that can range from 0.1 nm to 500 nm.

In an embodiment, the methods of the present disclosure can be used to synthesize fibrous silica nanospheres with particle size in the range of from 1 nm to 100 micron with varied surface area that can range from 100 to 5000 $cm^2/gm$.

In another embodiment, the present disclosure provides a method for synthesizing catalysts, photocatalysts and $CO_2$ sorbents by coating or functionalization of fibrous silica nanospheres by various molecules and materials.

In a specific embodiment, $CO_2$ sorbents can be synthesized by functionalizing the surface of fibrous silica nanospheres by physical or covalent loading/functionalization using various amine molecules, C3N4 molecules, dendrimer, polymer or other amine containing molecules.

In another specific embodiment, catalysts and photocatalysts can be synthesized by physical or covalent coating the fibers of silica nanospheres by various materials selected from metal oxides, C3N4, graphene, carbon, perovskite, dyes, quantum dots, metal, polymer and dendrimer.

In another embodiment, fibrous silica nanospheres having wide range of particle sizes with controlled surface area, pore volume, pore size and fiber density can be synthesized under reflux conditions, by mixing the reactants in an open reactor and heating them at solvent boiling point or lower temperature.

In another embodiment, the present disclosure provides a method for synthesizing fibrous silica nanospheres with controlled size and morphology using conventional heating such as refluxing in an open reactor, thereby eliminating the need for microwave heating in a closed reactor or the need for any sophisticated heating assembly.

In another embodiment, the present disclosure provides a method for synthesizing fibrous silica nanospheres that does not require microwave or pressure reactors.

In yet another aspect, the present disclosure provides a continuous flow method for synthesizing fibrous silica nanospheres, the method include the steps of (a) flowing a silica precursor, a hydrolyzing agent, a template molecule, a co-surfactant and one or more solvents into a flow reactor to form a reaction solution; (b) heating the reaction solution within a heating source for a length of time; and (c) obtaining fibrous silica nanospheres.

In the continuous flow method, the reactants and the solvents may be sequentially or simultaneously pumped into a mixing section of a flow reactor and stirred. Flow reactors well known in the art of nanoparticle synthesis can be utilized in the continuous flow method of the present disclosure. The flow rate of the silica precursor, hydrolyzing agent, template molecule, co-surfactant and the solvents can be adjusted in order to achieve desired nanosphere properties and production rate.

EXAMPLES

The present disclosure is further explained with help of following examples. However, it is to be understood that the foregoing examples are merely illustrative and are not to be taken as limitations upon the scope of the invention. Various changes and modifications to the disclosed embodiments will be apparent to those skilled in the art. Such changes and modifications may be made without departing from the scope of the invention.

Example 1

Synthesis of Fibrous Silica Nanospheres with Controlled Size and Fiber Density

Cetyltrimethylammonium bromide (CTAT) and urea were first dissolved in deionized water (300 mL) by vigorously stirring at 1400 rpm for 10 minutes in a 2 L conical flask. To the above mixture, a solution of tetraethoxysilane (TEOS) in cyclohexane (300 mL) was added dropwise in 20 minutes under stirring by using dropping funnel and stirred at 1400 rpm for 10 minutes. 1-Pentanol (18 mL) was then dropwise added to above mixture in 5 minutes under stirring and the resulting mixture was further stirred for several minutes (outside stirring time). The reaction mixture was then transferred into a IL microwave reactor and exposed to microwave radiations (Maximum Power—800 W) to achieve required temperature via 30 minutes ramp from room temperature (23° C.), with 50% stirring speed in the Milestone Ethos-1 microwave reactor. At given temperature, the reaction mixture was maintained (hold time) for few minutes to several hours (Table S1) and then let it cooled to room temperature naturally. The solid product was isolated by centrifugation, washed with ethanol (3 times) and water (3 times), followed by air drying. The product was calcined at 550° C. for 6 h in air, to yield pure fibrous silica nanospheres (KCC-1). The exact values of chemicals/solvents taken, reaction temperature, time, outside stirring time, are given in Table S1 and also mentioned in caption of each figure. All the materials were characterized by scanning electron microscopy (SEM), transmission electron microscopy (TEM), low and broad angle powder X-ray diffraction and $N_2$, sorption analysis.

Figure 1A:
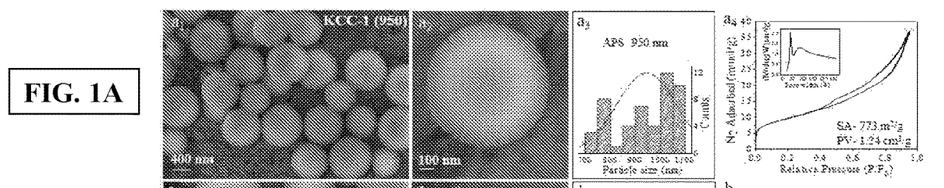
FIGS. 1A-F illustrate SEM images, particle size distribution, N2 sorption isotherm (inset shows pore size distribution) of fibrous silica nanospheres (KCC-1) synthesized with different urea concentrations of 0.9 g (FIG. 1A), 1.8 g (FIG. 1B), 3.6 g (FIG. 1C), 7.2 g (FIG. 1D), 28.8 g (FIG. 1E), and 57.6 g (FIG. 1F), in accordance with embodiments of the present disclosure.
Figure 1B:
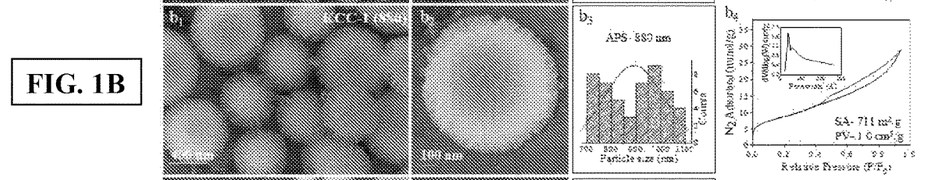
Figure 1C:
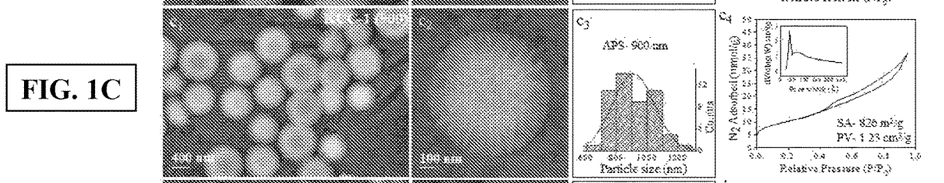
Figure 1D:
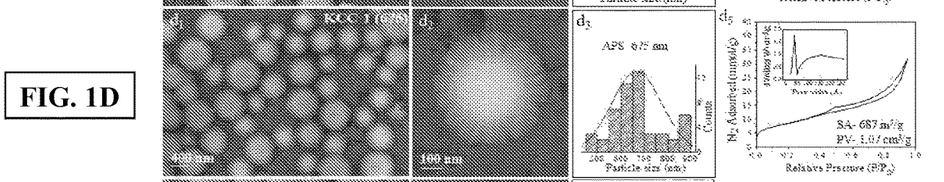
Figure 1E:
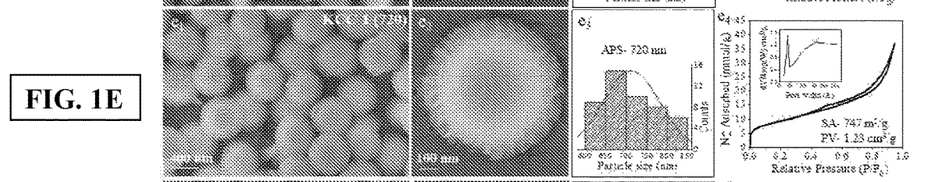
Figure 1F:
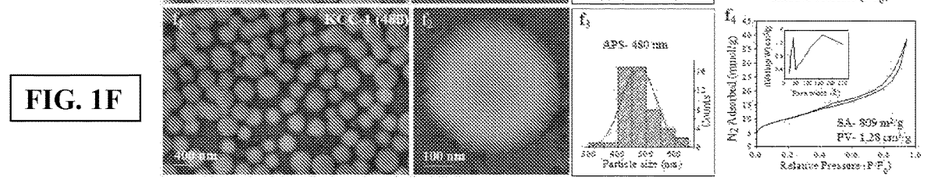
Figure 2A:
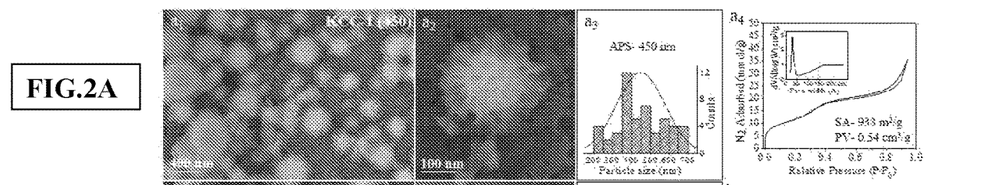
FIGS. 2A-F illustrate SEM images, particle size distribution, N2 sorption isotherm (inset shows pore size distribution) synthesized with urea concentration of 28.8 g (0.44 moles) and reaction hold time of 5 min (FIG. 2A), 15 min (FIG. 2B), 30 min (FIG. 2C), 1 h (FIG. 2D), and with urea concentration of 1.8 g (0.03 moles) and reaction hold time of 1 h (FIG. 2E), 3 h (FIG. 2F), in accordance with embodiments of the present disclosure.
Figure 2B:
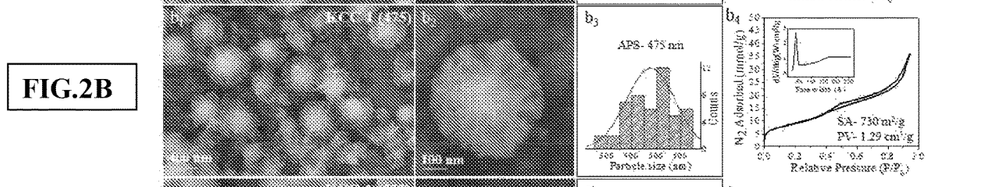
Figure 2C:
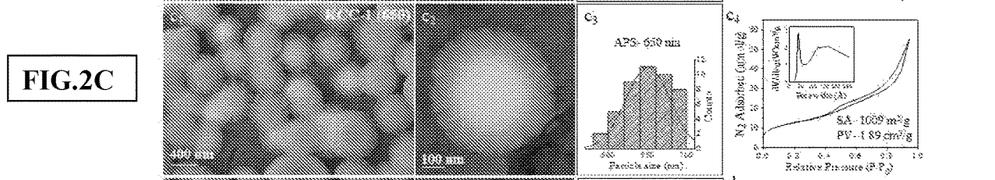
Figure 2D:
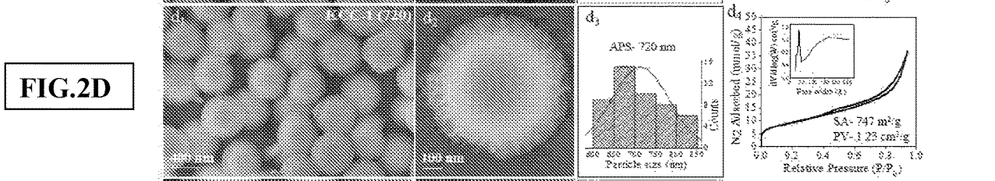
Figure 2E:
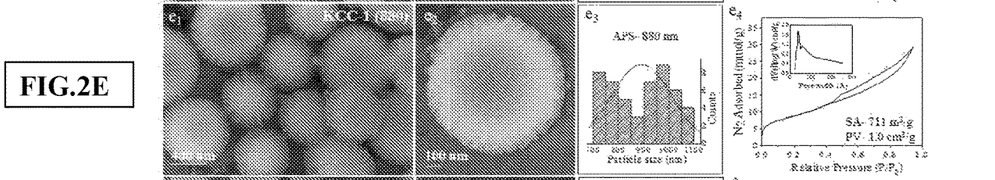
Figure 2F:
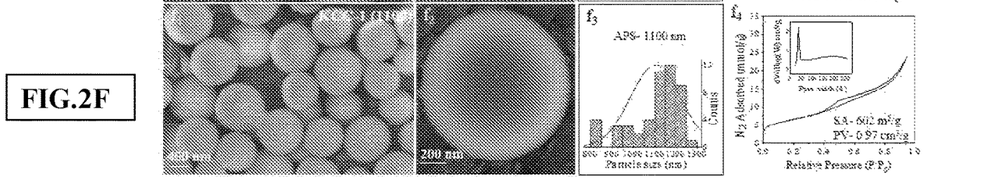

Effect of Urea concentration: In order to gain control over the particle size and fiber density of silica nanospheres, the effect of urea concentration in the synthetic protocol was studied. The SEM images of the synthesized silica nanospheres with varying amount of urea are shown in FIGS. 1A-F ($a_1$-$f_1$). These figures indicate the formation of various sized KCC-1 with different fiber density. Average particle size could be varied between 480 and 950 nm, with BET surface area (SA) from 687 to 826 $m^2$/g and pore volume (PV) from 1.0 to 1.28 $cm^3$/g (FIGS. 1A-F, Table S1). Change in initial urea concentration from 0.9 g to 3.6 g, did not affect the particle size with APS around 900 nm (FIGS. 1A-C). However, with further increase in urea concentration, significant effect on particle size was observed, with 7.2 g yielded 687 nm and 57.6 g yielded 480 nm APS KCC-1 spheres, respectively (FIGS. 1D and 1F). Thus, it was observed that with increases in urea concentration from 0.9 g to 57.6 g, APS of KCC-1decreases. Significant changes in surface area and pore volume, with change in urea concentration was not observed. Pore size distribution also remained same, with major pore size of 3.7 nm, and distribution of other larger mesopores. $N_2$ adsorption-desorption isotherm also showed similar type IV pattern with hysteresis loop (FIGS. 1A-F ($a_4$-$f_4$)).

Cetyltrimethylammonium bromide (CTAT) and urea were first dissolved in deionized water (300 mL) by vigorously stirring at 1400 rpm for 10 minutes in a 2 L conical flask. To the above mixture, a solution of tetraethoxysilane (TEOS) in cyclohexane (300 mL) was added dropwise in 20 minutes under stirring by using dropping funnel and stirred at 1400 rpm for 10 minutes. 1-Pentanol (18 mL) was then dropwise added to above mixture in 5 minutes under stirring and the resulting mixture was further stirred for several minutes (outside stirring time). The reaction mixture was then transferred into a IL microwave reactor and exposed to microwave radiations (Maximum Power-800 W) to achieve required temperature via 30 minutes ramp from room temperature (23° C.), with 50% stirring speed in the Milestone Ethos-1 microwave reactor. At given temperature, the reaction mixture was maintained (hold time) for few minutes to several hours (Table S1) listed below and then let it cool to room temperature naturally. The solid product was isolated by centrifugation, washed with ethanol (3 times) and water (3 times), followed by air drying. The product was calcined at 550° C. for 6 h in air, to yield pure fibrous silica nanospheres (KCC-1). The exact values of chemicals/solvents taken, reaction temperature, time, outside stirring time, are given in Table S1 and also mentioned in caption of each figure. All the materials were characterized by scanning electron microscopy (SEM), transmission electron microscopy (TEM), low and broad angle powder X-ray diffraction and $N_2$, sorption analysis.

Interestingly, not only size, change in fiber density of spheres was observed with time at both the urea concentration and they became denser with increase in hold time. Although, no systematic pattern was observed for surface area, pore volume and $N_2$ sorption isotherm in this case, but pore size distribution became narrower with increase in fiber density, having 3.7 nm as major pore and other mesopores distribution decreases with increase in fiber density (FIGS. 2A-F ($a_4$-$f_4$)). These results indicated that, with time spheres are not only growing bigger but more fibers are formed and hence they became denser.

Figure 3A:
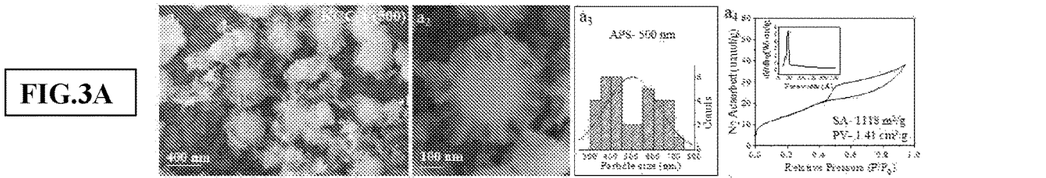
FIGS. 3A-C illustrate SEM images, particle size distribution, N2 sorption isotherm (inset shows pore size distribution) of fibrous silica nanospheres (KCC-1) synthesized with CTAB concentration of 1.5 g (FIG. 3A), 3 g (FIG. 3B), 6 g (FIG. 3C), in accordance with embodiments of the present disclosure.
Figure 3B:
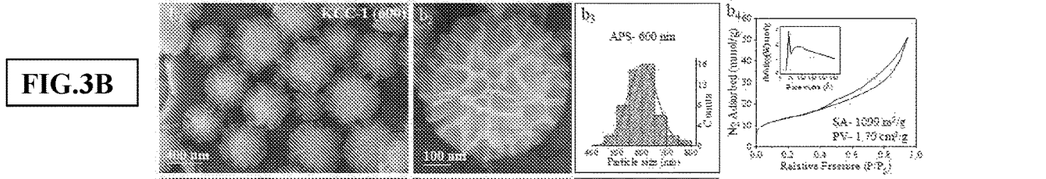
Figure 3C:
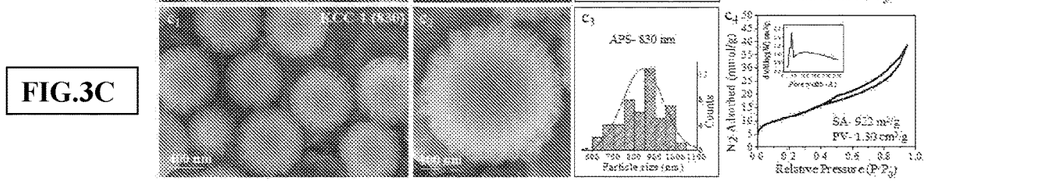

Effect of CTAP concentration: The effect of CTAB concentration on particle size and their textural properties was studied. With increase in CTAB concentration, particle size increased from 500 to 830 nm APS (FIGS. 3A-C). Using 1.5 g CTAB, nanospheres with 500 nm APS was obtained with high surface area of 1118 $m^2$/g and pore volume of 1.41 $cm^3$/g (FIG. 3A). Notably, pore size distribution was narrower with no larger pores present (FIG. 3A ($a_3$)). When CTAB amount was increased to 3 g, nanospheres with APS of 600 nm having less dense fibers was obtained, with narrow particle size distribution (FIG. 3B). Pore volume increased to 1.7 $cm^3$/g, with similar surface area of 1099 $m^2$/g. With further increases in CTAB amount to 6 g, sphere size was further increased to 830 nm, with similar pore volume and surface area (FIG. 3B). In this case fiber density increased with narrower pore size distribution.

Figure 4A:
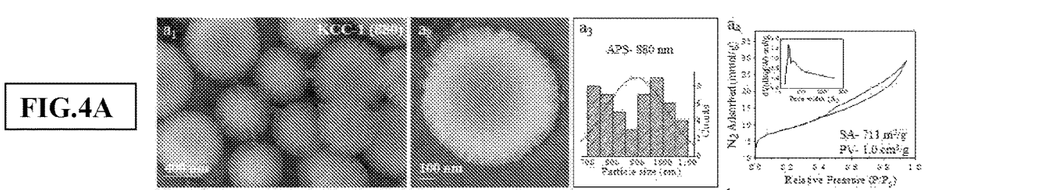
FIGS. 4A-B illustrate SEM images, particle size distribution, N2 sorption isotherm (inset shows pore size distribution) of fibrous silica nanospheres (KCC-1) synthesized with reaction temperature of 120° C.
Figure 4B:
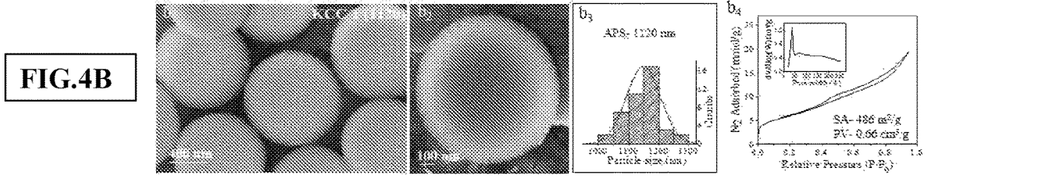

Effect of reaction temperature: Since both nucleation and growth stages can be affected by reaction temperature, the effect of reaction temperature on size and textural properties of KCC-1 was studied (FIGS. 4A-B). nanospheres formation at 100° C. in 1 h reaction time was not observed, although very small (20-50 nm) and nearly spherical particles were formed (not shown in the figure). However, at 120 and 140 ° C., nanospheres with APS of 880 and 1120 nm were formed, respectively (FIGS. 4A-B). With increase in reaction temperature not only the size increased but an increase in the fiber density was also observed. nanospheres (1120) was denser than nanospheres (880), which reduced its surface area to 486 $m^2$/g as compare to 711 $m^2$/g for KCC-1 (880). Though $N_2$ sorption isotherm had similar patterns, the pore volume of KCC-1 (1120) was less 0.66 $cm^3$/g compared to 1.0 $cm^3$/g of KCC-1 (880). Pore size distribution also became narrower with increase in reaction temperature, with less larger mesopores in nanospheres (1120) (FIGS. 4A ($a_4$) and 4B ($b_4$)).

Figure 5A:
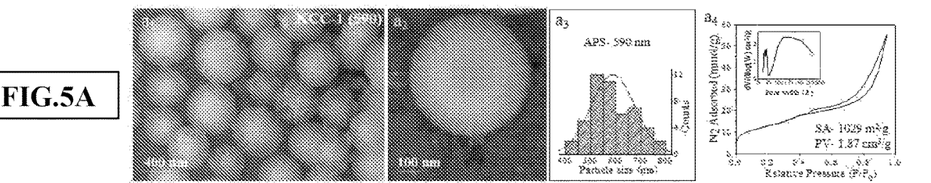
FIGS. 5A-F illustrate SEM images, particle size distribution, N2 sorption isotherm (inset shows pore size distribution) of fibrous silica nanospheres (KCC-1) synthesized with 1-pentanol concentration of 9 mL (FIG. 5A), 18 mL (FIG. 5B), 36 mL (FIG. 5C), 72 mL (FIG. 5D), and 1-octanol of 18 mL (FIG. 5E), and 1-propanol of 18 mL (FIG. 5F),), in accordance with embodiments of the present disclosure.
Figure 5B:
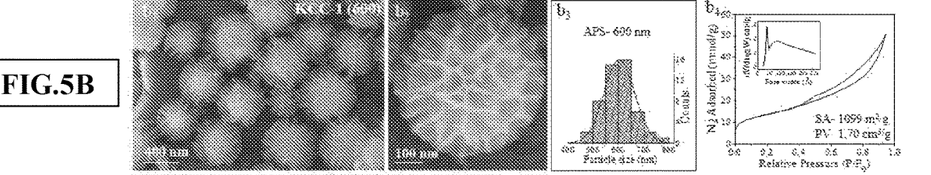
Figure 5C:
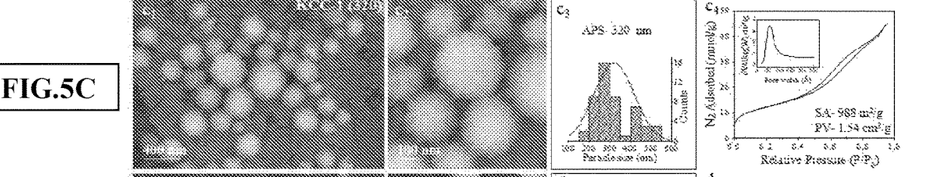
Figure 5D:
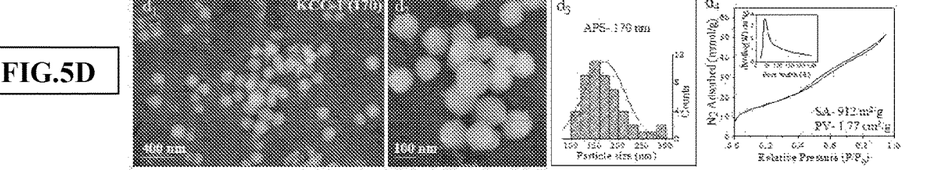

Effect of 1-pentanol concentration: Good control over particle size and fiber density/pore volume was achieved by changing urea, CTAB amounts, reaction time and temperature. However, in order to achieve even smaller particle sizes of nanospheres to make them useful in bio-related applications like drug delivery, the effect of 1-pentanol concentration was studied. It was observed that change in 1-pentanol concentration enabled nanospheres formation with APS of 170 nm (FIG. 5D).

Figure 5E:
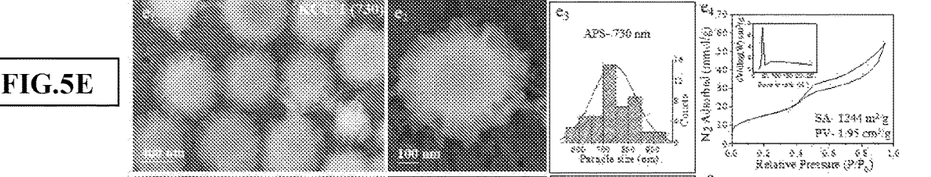
Figure 5F:
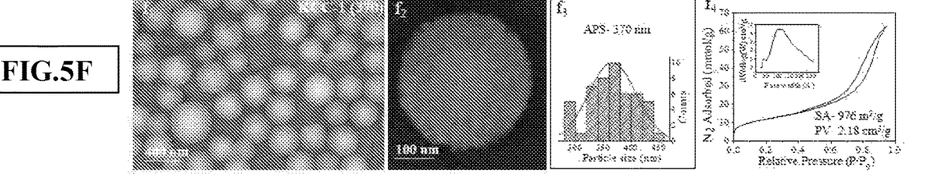

Gradual decrease in particle size from around 600 to 170 nm APS was observed, with increase in 1-pentanol concentration from 18 mL to 72 mL (FIGS. 5A-D ($a_3$-$d_3$)). Although $N_2$ sorption isotherm showed similar pattern with slight change in hysteresis loop, particle size distribution became narrower with decrease in particle size (FIGS. 5A-D ($a_4$-$d_4$)). Notably, KCC-1 (590) showed very high pore volume of 1.89 $cm^3/g$, and pore size distribution ranging from 11.8 to 21.0 nm, in addition to the sharp 3.7 nm pore. This indicates that increase in pore volume is due to increase in the number of larger mesopores. KCC-1 (370) showed sharp pore around 5.5 nm while KCC-1 (370) showed at 3.8 nm. Notably surface area in all the cases was around 1000 $m^2/g$. Interestingly, when 1-pentanol was replaced with 1-octanol and 1-propanol, KCC-1 particles size as well as their textural properties changed dramatically (FIGS. 5E-F). 1-Octanol yielded KCC-1 with APS of 730 nm while 1-propanol yielded 370 nm APS. Not only the size, but other textual properties also changed significantly. Pore volume for KCC-1 (730) was 1.95 $cm^3 g$ while for KCC-1 (370) was 2.18 $cm^3/g$, which was found to be the highest value reported till date. Its surface area was also very high (1244 $m^2/g$), double than previously reported surface area values for KCC-1. Even the pore size distribution changed, with 3.8 nm narrow pores for KCC-1 (730) as compared to broad 9.5 to 12.1 nm pores for KCC-1 (370). Although $N_2$ sorption isotherm patterns were same, the hysteresis loop starts at lower pressure in case of KCC-1 (730) as compared to KCC-1 (370). This indicated the role of co-surfactant (1-pentanol) in stabilizing the micelles/microemulsion droplets, which affected the size and textural properties of the KCC-1. These results indicated the Winsor type system or microemulsion type mechanism responsible for KCC-1 formation, than micelles assisted seed-growth mechanism.

Figure 6A:
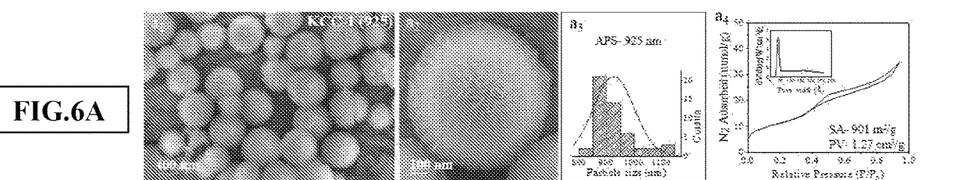
FIGS. 6A-D illustrate SEM images, particle size distribution, N2 sorption isotherm (inse shows pore size distribution) of fibrous silica nanospheres (KCC-1) synthesized with solvent ratio of water: cyclohexane ; 450:150 mL (FIG. 4A), 150:450 mL (FIG. 4B), 15:600 int (FIG. 4C), 600:0 mL 4D), in accordance with embodiments of the present disclosure.
Figure 6B:
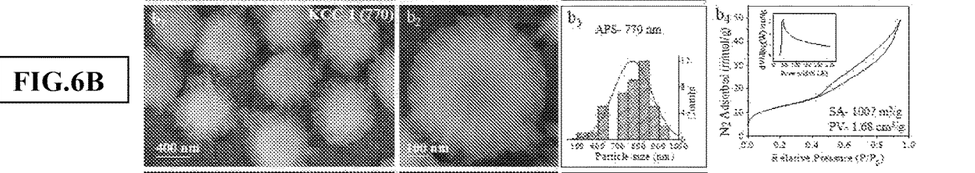
Figure 6C:
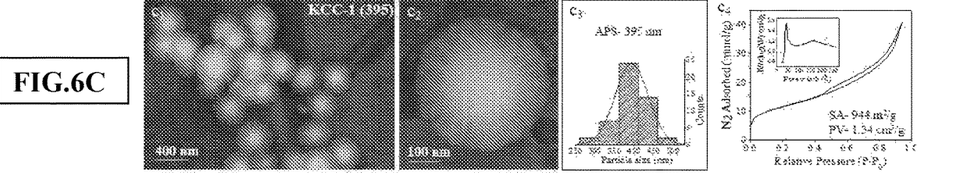
Figure 6D:
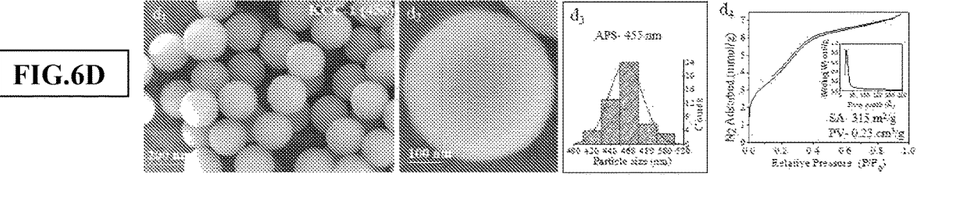

Effect of water: cyclohexane solvent ratio: Since two immiscible solvents, water and cyclohexane were employed in the synthesis of KCC-1, the effect of solvent ratio on particle size and other properties was studied. To get the insight, KCC-1 was synthesized in different water: cyclohexane solvent ratio, i.e. 450:150 mL, 150:450 mL, 15:600 mL (15 mL water to dissolve urea) and 600:0 mL 6A-D). As expected, when only water was used as a solvent, no KCC-1 fibrous spheres were formed and solid Stober's like silica spheres were formed, with reduced surface area and pore volume of 215 $m^2/g$ and 0.23 $cm^3/g$ respectively, indicating its non-porous structure (FIG. 6D). Interestingly, when cyclohexane amount was increased, particle size was reduced from 925 nm APS to 395 nm APS. All of them possessed good surface area and pore volume (FIGS. 6A-C ($a_4$-$c_4$)). Thus, particle size can be tuned by tuning the solvent ratios.

Figure 7A:
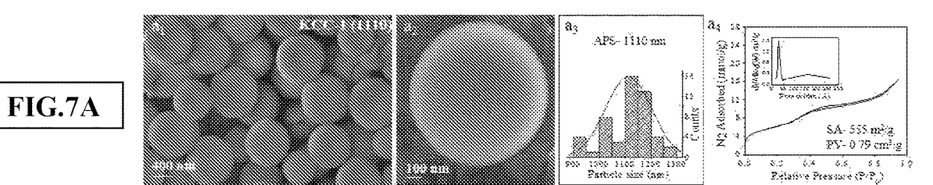
FIGS. 7A-C illustrate SEM images, particle size distribution, N2 sorption isotherm (inset shows pore size distribution) of fibrous silica nanospheres (KCC-1) synthesized with outside stirring time (time between 1-pentanol addition and microwave exposure), 30 min (FIG. 7A), 2 h (FIG. 7B), 5 h (FIG. 7C), in accordance with embodiments of the present disclosure.
Figure 7B:
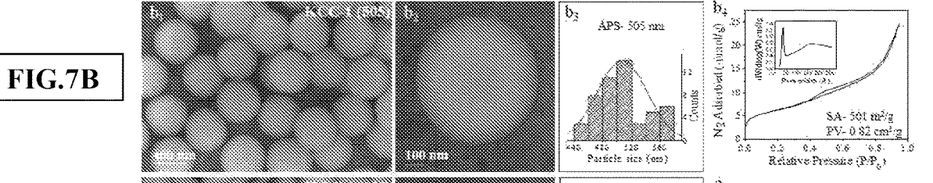
Figure 7C:
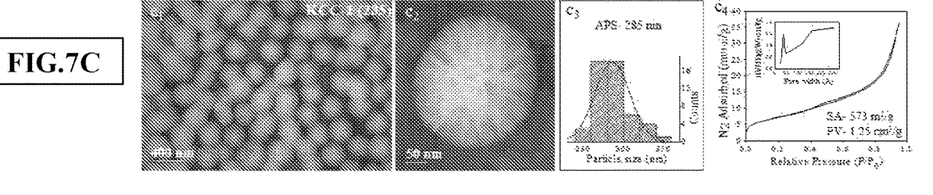

Effect of outside stirring time: The effect of outside stirring time on KCC-1 size was studied. Surprisingly, with increase in outside stirring time (at room temperature, before exposure to microwaves), drastic change in particle size was observed (FIGS. 7A-C). 30 minutes outside stirring yielded 1110 nm APS, while 2 h stirring time reduces the APS to 505 nm and more fascinatingly, 5 h, stirring time, reduces the particle size further to 285 nm APS (FIGS. 7A-C). Particle size distribution also became narrower with increase in outside stirring time. Other properties did not change drastically. These results indicated that nucleation-seed stage might have started at room temperature even before exposure to microwave/heating. Longer stirring time allowed more seeds formation and hence smaller final particle size. On the other hand, if microemulsion droplet formation mechanism is to be considered true, these droplets (which are acting as reactors for KCC-1 formation) might getting smaller with stirring time, thus reducing the particle size of KCC-1.

Example 2

Synthesis of Fibrous Silica Nanospheres (KCC-1) Under Reflux Conditions in Open Reactor Synthesis of these KCC-1 with varied particle size, fiber density, pore volume and surface area, was also attempted under reflux conditions, by mixing the reactants in open reactor and heating them at their boiling point or lower temperature. The reflux condition in open reactor also enabled synthesis of fibrous silica nanospheres with greater control over particle size, fiber density, surface area, and pore volume.

ADVANTAGES OF THE PRESENT INVENTION

The present disclosure provides a method for synthesizing fibrous silica nanospheres with greater control of size and morphology.

The present disclosure provides a method for synthesizing fibrous silica nanospheres with controlled particle size, fiber density and textural properties such as surface area, pore volume and pore size using non-pressurized reactors.

The present disclosure provides a simple and highly efficient method for synthesizing fibrous silica nanospheres, wherein the particle size, fiber density, surface area, pore size and pore volume of fibrous silica nanospheres can be effectively controlled and tuned by controlling the reaction parameters of the method.

The present disclosure provides a method for synthesizing fibrous silica nanospheres using conventional heating such as refluxing in an open reactor, thereby eliminating the need for microwave heating in a closed reactor or the need for any sophisticated heating assembly.

The present disclosure provides a method for synthesizing fibrous silica nanospheres, wherein the method does not require microwave or pressure reactors.

The present disclosure provides a method for synthesizing high surface area fibrous silica nanospheres in wide range of particle sizes with controlled pore volume, pore size and fiber density.

We claim:

1. A method for synthesizing fibrous silica nanospheres, the method comprising, in sequence, the steps of:
   (a) providing a reaction mixture comprising a silica precursor, a hydrolyzing agent, a template molecule, a co-surfactant and one or more solvents;
   (b) maintaining the reaction mixture under stirring;
   (c) heating the reaction mixture under reflux conditions in an open reactor at a temperature of 120° C. for a length of time from 5 minutes to 180 minutes;
   (d) cooling the reaction mixture to obtain a solid; and
   (e) calcinating the solid to obtain fibrous silica nanospheres, wherein heating the reaction mixture in step (c) is performed without employing microwave irradiation or a pressure reactor, wherein the method provides the fibrous silica nanospheres with a controlled particle size, a fiber density, and textual properties including a surface area, a pore volume and a pore size, wherein the fibrous silica nanospheres having the controlled particle size ranging 1 nm-100 microns with the pore volume ranging from 0.1 to 5 cm$^3$/g.

2. The method according to claim 1, wherein the silica precursor is tetraethoxysilane.

3. The method according to claim 1, wherein the hydrolyzing agent is urea.

4. The method according to claim 1, wherein the template molecule is cetyltrimethylammonium bromide.

5. The method according to claim 1, wherein the co-surfactant is 1-pentanol.

6. The method according to claim 1, wherein the one or more solvents are selected from aqueous solvent and organic solvent.

7. The method according to claim 1, wherein the fibrous silica nanospheres having the controlled particle size ranging from 1 nm to 100 micron with a fiber density, wherein number of fibers in each nanosphere ranging from 10 fibers to 10000000 fibers.

8. The method according to claim 1, wherein the fibrous silica nanospheres having the controlled particle size ranging from 1 nm 100 micron with the pore size distribution ranging from 0.1 nm to 500 nm.

9. The method according to claim 1, wherein the fibrous silica nanospheres having the controlled particle size ranging from 1 nm to 100 micron with the surface area ranging from 100 to 5000 cm$^2$/g.

10. The method according to claim 1, wherein the controlled particle size, the fiber density, and textual properties including the surface area, the pore volume and the pore size of the fibrous silica nanospheres are controlled by further controlling one or more parameters of the method selected from concentration of the hydrolyzing agent in the reaction mixture, concentration of the template molecule in the reaction mixture, concentration of the co-surfactant in the reaction mixture, concentration of the one or more solvents in the reaction mixture, heating temperature of the reaction mixture, and reaction time.

* * * * *